United States Patent [19]

Gikas

[11] 4,167,869

[45] Sep. 18, 1979

[54] APPARATUS FOR MEASURING HAIR GROOMING FORCE

[75] Inventor: Giorgos X. Gikas, Washington, D.C.

[73] Assignee: The Gillette Company, Boston, Mass.

[21] Appl. No.: 840,298

[22] Filed: Oct. 7, 1977

[51] Int. Cl.² .............................. G01L 1/22; A45D 24
[52] U.S. Cl. .................................... 73/141 A; 73/160;
 132/11 R
[58] Field of Search ................. 73/141 R, 141 A, 160;
 132/1 R, 7, 11 R, 45 R, 45 A; 15/154 R

[56] References Cited

U.S. PATENT DOCUMENTS

| | | | |
|---|---|---|---|
| 2,316,975 | 4/1943 | Ruge | 73/88.5 R X |
| 3,459,197 | 8/1969 | Wilson | 132/1 R |
| 3,928,558 | 12/1975 | Cheesman et al. | 424/47 |
| 3,946,606 | 3/1976 | Abrioux et al. | 73/141 R X |

Primary Examiner—James J. Gill
Attorney, Agent, or Firm—Richard A. Wise; Donald E. Mahoney

[57] ABSTRACT

An apparatus for measuring the incremental grooming force experienced by a hair tress during combing, and supplying an instantaneous readout of that force. The apparatus includes a comb or brush with strain gages attached to it which change resistance when mechanically deformed. The change in resistance is electrically measured to provide an indication of incremental grooming force. A continuous monitor is connected to the resulting electrical signal to provide an instantaneous indication of incremental grooming force. A method for using the apparatus to reduce the creation of split ends during hair grooming is also provided.

9 Claims, 7 Drawing Figures

4,167,869

APPARATUS FOR MEASURING HAIR GROOMING FORCE

BACKGROUND OF THE INVENTION

1. Field of the Invention

This invention relates to a hair combing apparatus and, more particularly, to a hair combing apparatus for monitoring combing force.

2. Description of the Prior Art

A problem frequently encountered especially by people with long hair is a condition known as "split ends". "Split ends" are produced when the cuticle is stripped off a hair fiber by excessive combing force. "Combing force" refers to a force experienced by a hair tress when a comb is pulled through the tress. "Grooming force" is a generic term referring to that same force applied by any type of grooming means, including combs and brushes. Combing force will be used throughout this specification since it is the more commonly accepted term, however, it will be appreciated that the same considerations apply to measuring both combing force and other types of grooming force. "Hair tress" is used to refer to a lock or curl of hair either separate from or growing out of a person's head. When measuring the force used to comb a hair tress, a comb experiences resistance throughout the length of that tress. Two terms used frequently to describe that resistance are "total combing force" and "incremental combing force". Total or cumulative combing force is a summation of the forces encountered over an entire stroke, whereas the incremental combing force is the force encountered at any single point along a stroke. The maximum incremental combing force encountered during the course of a stroke is known as the "peak combing force".

Apparatus for measuring combing force are well known in the prior art and generally consist of three major types. The first, an example of which is described in U.S. Pat. No. 3,459,197, comprises a flexible comb with mechanical means for measuring the peak deflection of the comb and relating it to the peak combing force applied during one complete stroke of the comb. After each stroke of the comb, the user must record the reading and reset the indicator to zero.

The second type of apparatus includes large complicated testing instruments requiring a hair sample to be attached to a transducer cell within the apparatus. Such devices are not useful for measuring the combing force experienced by hair while it is still attached to the head.

The third type of apparatus, an example of which is described in U.S. Pat. No. 3,928,558, comprises an aluminum comb fitted with a strain gage. The voltage output resulting from the movement of a tress of hair through the comb is summed by an integrator, a device which produces an output proportional to the integral of one variable (combing force) with respect to another (time). The output from such a device, at any point in time, reveals only the total amount of force exerted up to that moment. It does not give any indication of the incremental amount of force being applied at that instant. Thus, such a device measures cumulative combing resistance rather than instantaneous combing resistance. Cumulative combing resistance does not supply any indication of peak forces experienced by the hair, peak forces being the type of force most damaging to hair.

One method of reducing split ends is to continuously monitor the magnitude of force applied to a tress of hair during the entire length of each combing stroke, allowing a person using the apparatus to keep the force applied to each portion of the hair tress within an acceptable range. Such an apparatus could be used in the home, or used by a hair care specialist as a means of training a person to reduce the force applied in combing her hair. An instantaneous feedback of that force is an essential element in learning to associate the pulling sensation experienced by the scalp with the force being applied, and thus, keep that force within an acceptable range.

Accordingly, an apparatus is needed which can be used to measure the force used in combing hair while it is still attached to the head in combination with a means for providing instantaneous feedback of that force.

SUMMARY OF THE INVENTION

The present invention comprises a hair grooming means such as a comb or a brush having a handle. The grooming means is coupled to strain measuring means to provide an indication of movement of the grooming means with respect to the handle in response to forces encountered when combing or brushing hair. A continuous monitor is electrically connected to strain measuring means to provide an instantaneous indication of incremental grooming force as measured by the movement of the grooming means.

DESCRIPTION OF THE PREFERRED EMBODIMENT

Figure 1:
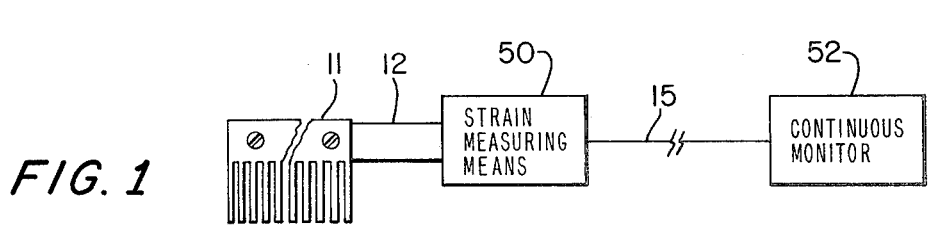
FIG. 1 is a block diagram illustrating a strain measuring system using a continuous monitor according to the invention.

Referring to FIG. 1, there is shown a block diagram of a combing force measuring apparatus according to the invention, comprising comb 11, strain measuring means 50, and continuous monitor 52. Frictional forces created when comb 11 is drawn through a hair tress are transmitted to strain measuring means 50, by shaft 12. The amount of strain measured by strain measuring means 50 is proportional to the summation of the torques provided by the frictional forces created when comb 11 is drawn through the hair tress. The frictional forces measured are almost exclusively the result of fiber-fiber interactions since the coefficient of friction between comb 11 and the fibers in a hair tress is negligible in comparison. The output from strain measuring means 50 is transmitted to continuous monitor 52. Monitor 52 can be any of the types of well known apparatus which give an instantaneous readout of voltage proportional to the frictional forces, e.g., a chart recorder or a voltage meter calibrated in units of force. However, in contrast to the types of prior art combing force measuring apparatus, the present apparatus alllows the user to limit the force applied to the hair during the course of the stroke. Prior art apparatus useful on live heads of hair, such as the mechanical device described in U.S. Pat. No. 3,459,197, described above, would not reveal the use of excessive force until after its occurrence.

Figure 2:
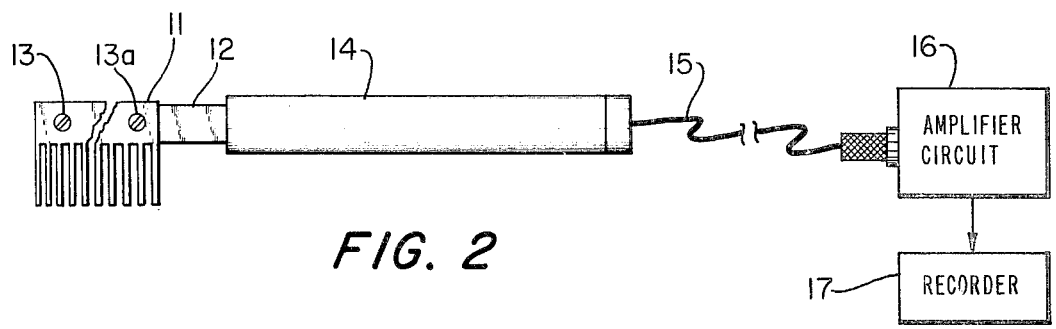
FIG. 2 is a side view of a hair combing apparatus arranged according to the invention.

Referring to FIG. 2, there is shown a comb 11 attached to a flat shaft 12 by removable screws 13 and 13a. While a comb is shown in FIG. 1, it is possible to substitute other attachments as brushes or combs with finer or coarser teeth or bristles. For instance, a comb with coarser teeth is preferable when attempting to untangle hair after shampooing, whereas a comb with finer teeth would be used more advantageously on dry hair. Since the number of fibers engaged by a comb during each stroke is dependent upon the diameter of the hair fibers making up the tress, approximately the same number of fiber-fiber interactions will occur during each stroke of the comb as long as the teeth of the particular comb are always filled. To accomplish this, thereby making the force measurements more reproducible, it is preferable to use a relatively coarser comb on coarse hair and a finer comb on fine hair. This insures that the teeth of the comb are filled with hair fibers at every point along each stroke.

Shaft 12 extends into the handle 14. A cable 15 electrically connects an amplifier circuit 16 to a stress measuring circuit, further described below. Amplifier circuit 16, in turn, is electrically connected to a suitable recorder capable of continuously monitoring electrical signals from the amplifier circuit. For example, in applications where a permanent record is desired, a chart recorder can be readily used to continuously record a voltage output from amplifier circuit 16.

Figure 3:
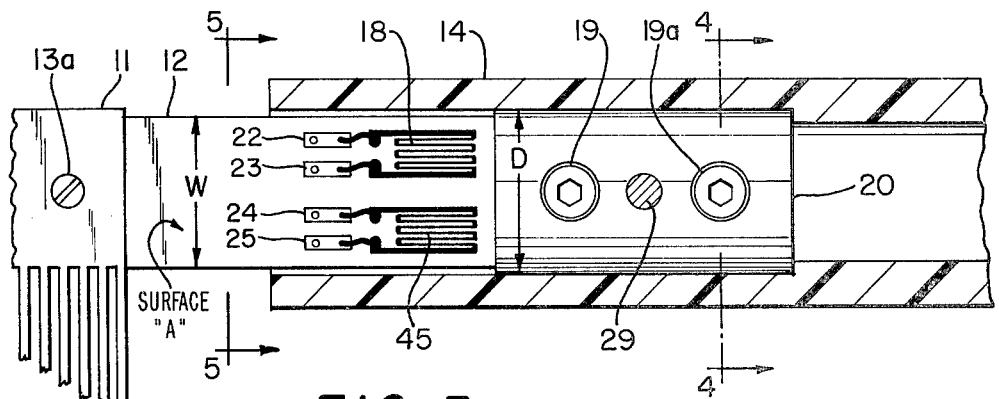
FIG. 3 is an enlarged side view of a comb and handle, partially cut away and sectioned to reveal placement of a strain measuring circuit.

Referring now to FIG. 3, there is shown an enlarged side view of the handle and comb wherein handle 14 and comb 11 are partially cut away and sectioned to reveal the underlying structure. Shaft 12 extends into a cylinder 20 which is designed to hold shaft 12 rigidly within handle 14. The diameter, D, of cylinder 20 is chosen to be larger than the width, W, of shaft 12 so that handle 14 can protect strain gages 18, 45, 46, and 47, (46 and 47 not shown) from physical damage without inhibiting the lateral deformation or movement of shaft 12 perpendicular to the plane of surface "A".

Figure 4:
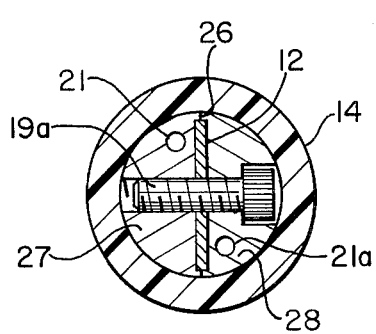
FIG. 4 is a cross section taken along lines 4—4 of FIG. 3.
Figure 5:
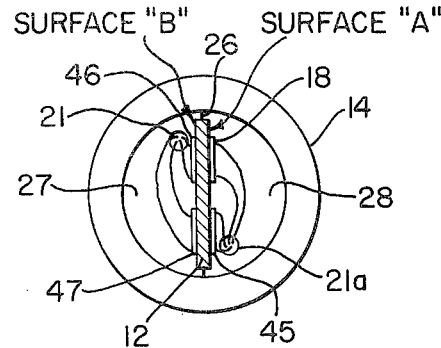
FIG. 5 is a cross section taken along lines 5—5 of FIG. 3.

As seen in FIGS. 4 and 5, cylinder halves 27 and 28 of cylinder 20 are designed to clamp tightly around shaft 12. This is accomplished by forming a groove of width W into the clamping surface of halves 27 and 28. This produces a lip 26 of each side of each cylinder half 27 and 28 which serves to center shaft 12. The same result can be accomplished by forming shaft 12 and cylinder 20 from a single piece of metal, but the attachment of strain gages is more readily performed if shaft 12 is available separately before assembly.

Screws 19 and 19a serve to clamp the two halves 27 and 28 of cylinder 20 firmly around shaft 12. Channels 21 and 21a extend through the length of cylinder 20 to provide a pathway for wires (as shown in FIG. 5) which carry input and output voltages between strain gages 18, 45, 46, and 47, and amplifier circuit 16. A screw extends through hole 29 to hold cylinder 20 rigidly within handle 14.

The preferred strain measuring means 50 is one or more strain gages attached to shaft 12. Pulling comb 11 through a hair tress causes shaft 12 to bend perpendicular to surfaces "A" and "B". When shaft 12 is bent toward surface "A", surface "A" will contract slightly, while surface "B" expands slightly. When a strain gage is bonded to either surface "A" or "B" of shaft 12, it will expand or contract, i.e., be strained, at the same time and in exactly the same manner as that surface. Changes in electrical resistance of the stretched or compressed strain gage are proportional to the strain in shaft 12. Thus, a reading of the strain can be obtained when an electric current is allowed to pass through the filament grid of a strain gage to a particular indicator. Referring to shaft 12, the point of greatest strain is near the clamping point of the shaft 12. Thus, the strain gages are placed as close as possible to the intersection of shaft 12 and cylinder 20. Accordingly, changes in strain of shaft 12 can be followed by monitoring changes in voltage resulting from resistance changes of strain gages 18, 45, 46, and 47.

The type of strain gages chosen must meet certain criteria. First, it must be electrically insulated from shaft 12. This can be accomplished for instance by a polyimide backing. Secondly, in cases where more than one strain gage is used, it must be small enough that two gages may be mounted side by side on shaft 12 having a width W. Finally, the change in resistance of a strain gage should be linear over the range of bending of shaft 12 to be expected from pulling comb 11 through a hair tress. Since the amount of bending will vary depending on the material from which shaft 12 is made, e.g., aluminum bends more than steel of equal thickness for a given force, it is important to match the strain gage with the shaft material. A suitable grid material for a strain gage when shaft 12 is made of steel would be constantan, a copper-nickel alloy.

A strain gage meeting all the above criteria when shaft 12 is made of steel is sold by BLH Electronics, Inc., of Waltham, Mass., under the trademark SR-4 Strain Gage (Model FAE-50-12-S6).

The number of strain gages employed is dependent upon the sensitivity desired. For instance, in the simplest case, a single gage would simply be electrically connected to an amplifier arranged to provide an output signal that is a direct measure of a resistance change in that one gage.

A convenient way of increasing the sensitivity of strain measuring means 50 involves the use of a prior art Wheatstone bridge circuit, a four-arm electrical bridge network in which each arm is a resistive element. If the resistive element in one of the arms consists of a strain gage, any strain applied to that gage after the bridge has been balanced, such that the voltage difference between the output terminals is zero, will result in the bridge being unbalanced in proportion to the amount of that strain. The substitution of a second strain gage in either of the arms adjacent to the first results in an increase in sensitivity, especially if the strain gages are located such that a tension strain on one gage is accompanied by a compression strain on the other and vice versa. In the preferred embodiment, a Wheatstone bridge circuit having strain gages in all four arms is employed. The use of strain gages in a Wheatstone bridge circuit is further described in Bulletin 103-2 entitled "Strain Gage Handbook" published by BLH Electronics, Inc., Waltham, Mass., Revised in April, 1967, incorporated by reference herein.

Figure 6:
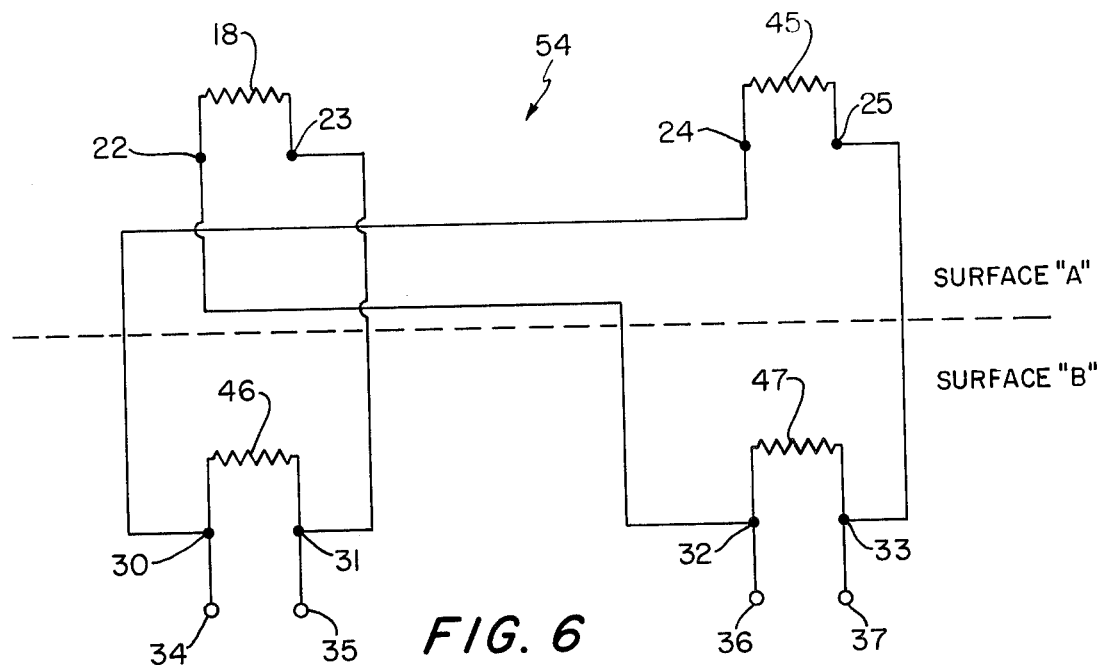
FIG. 6 is an electrical schematic of the strain measuring circuit.

FIG. 6 illustrates the physical arrangement and the electrical connection of measuring circuit 54 comprising strain gages 18, 45, 46, and 47, attached to surfaces A and B of shaft 12 to freely expand and contract in response to a deflection of shaft 12. The terms "Surface A" and "Surface B" as shown in FIG. 6 refer to the respective sides of shaft 12. It will be appreciated that any expansion of strain gages 18 and 45 will be accompanied by a contraction of gages 46 and 47, and that the reverse is true when shaft 12 is deflected in the opposite direction.

Figure 7:
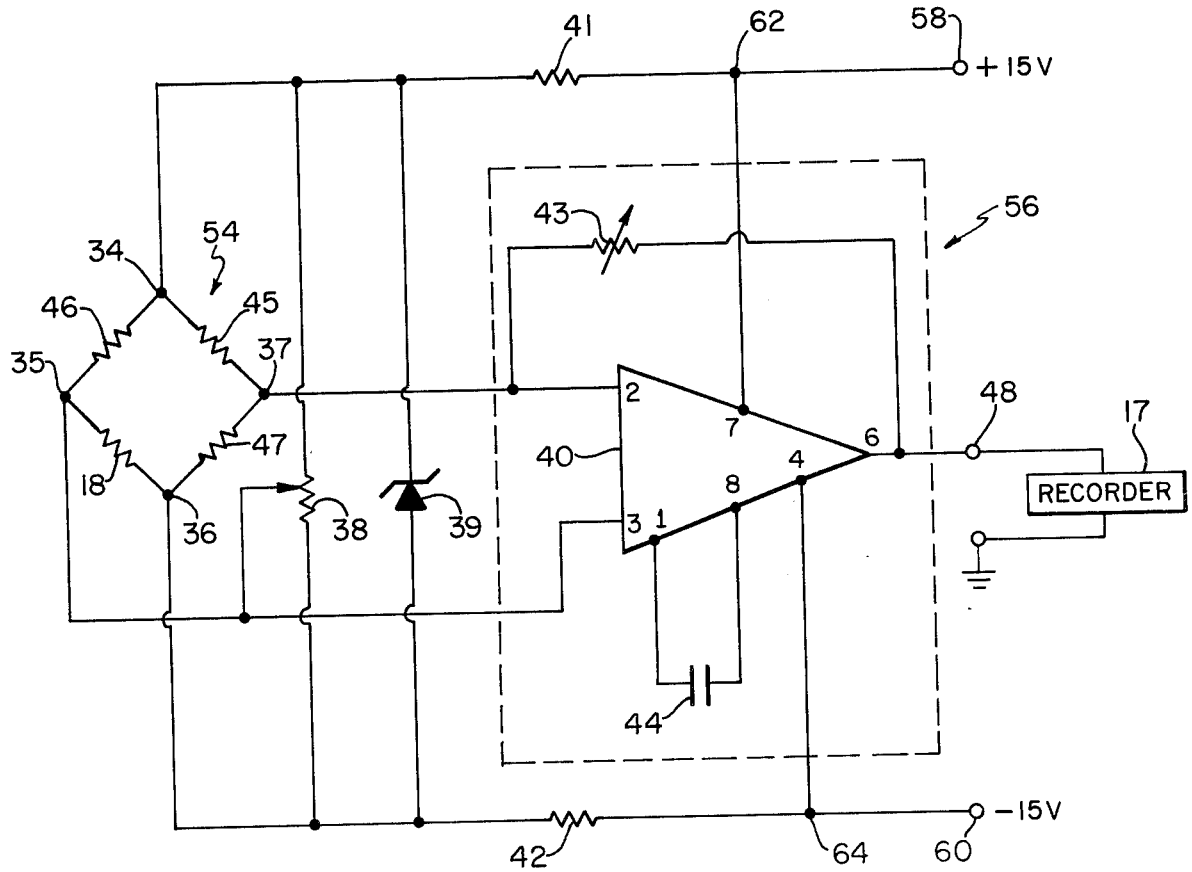
FIG. 7 is an electrical schematic of an amplifier circuit electrically connected to the strain measuring circuit.

Considering now measuring circuit 54 of FIGS. 6 and 7, it will be seen that strain gages 18, 45, 46, and 47, are electrically connected to form the arms of a Wheatstone bridge type circuit having power input terminals 34 and 36 and output terminals 35 and 37. The resistance of gages 18, 45, 46, and 47, is selected so that the bridge is balanced, thus the voltage difference between output terminals 35 and 37 is zero when an input signal is coupled to input terminals 34 and 36 and shaft 12 is not deflected.

To compensate for slight differences in the resistance of strain gages 18, 45, 46, and 47, while shaft 12 in undeflected, a 1000 ohm potentiometer is connected with its fixed terminals to input terminals 34 and 36 and its variable contact terminal connected to output terminal 35. By varying the position of the variable contact terminal along the fixed resistor of potentiometer 38, it is possible to make the resistance of gages 45 and 46 plus a portion of the fixed resistor equal to the resistance of gages 18 and 47 plus the remainder of the fixed resistor. This divides the output voltage in such a manner that the voltage difference between output terminals 35 and 37 is zero as long as shaft 12 is undeflected. Resistor 41 (180 ohms), connected between amplifier bias terminal 62 and input terminal 34, and resistor 42 (180 ohms), connected between amplifier bias terminal 64 and input terminal 36, serve to protect strain gages 18, 45, 46, and 47, from burn-out caused by accidental surges in input voltage. A five volt Zener diode 39 is connected in parallel between input terminal 34 and input terminal 36, to maintain a constant five volts despite a relatively wide range of current conducted through diode 39.

Operational amplifier system 56, consisting of operational amplifier 40, rheostat 43, (2000 ohms), and capacitor 44 (50 pf), amplifies the signal received from measuring circuit 54, resulting from deflection of shaft 12. A typical operational amplifier suitable for use in my invention is a Model LM108, manufactured by National Semiconductor Corporation, Santa Clara, California.

That input signal consists of the voltage difference between output terminals 35 and 37 that results from resistance changes of strain gages 18, 45, 46, and 47, induced by the deflection of shaft 12. Signal input terminal 2 of operational amplifier 40 is connected to output terminal 37. Signal input terminal 3 of operational amplifier 40 is connected to output terminal 35. Capacitor 44 is connected between terminals 1 and 8 of operational amplifier 40. Terminal 7 of operational amplifier 40 is connected to amplifier bias terminal 62 and terminal 4 of operational amplifier 40 is connected to amplifier bias terminal 64 to supply power to operational amplifier 40. Rheostat 43 is connected between operational amplifier 40 terminals 2 and 6 to control the magnitude of the amplified voltage signal provided by amplifier 40. Voltage supply terminal 58, connected to amplifier bias terminal 62, and voltage supply terminal 60, connected to amplifier bias terminal 64, supply power to operational amplifier system 56 and measuring circuit 54.

The amplified output signal at output terminal 48 is coupled to a prior art indicator such as a chart recorder or a voltage meter calibrated in units of force. For example, a chart recorder 17 would be used if a permanent record of long term studies of combing force applied to different tresses of hair was desired. A chart recorder 17 readily used for making a permanent record is a Heathkit Model IR-18M Chart Recorder, Heath Company, Benton Harbor, Michigan. The indicator system could also be a visual indicator such as a light arranged to flash or an audible indicator arranged to provide an audible signal when a preset level of force is exceeded. Alternatively, the indicator system could consist of a voltage meter calibrated in units of force.

To use the above described apparatus to reduce the creation of split ends during hair grooming, a person would first comb or brush her hair with the grooming means of the apparatus. The incremental grooming force applied to the hair tress would be measured by the strain measuring means and would instantaneously be relayed to the user by some type of readout such as a chart recorder, or a visible or audible signal. When the incremental grooming force applied to hair is indicated to have exceeded a previously determined level, the force applied to the hair tress through the grooming means is immediately reduced. By this method, the use of potentially damaging excessive levels of incremental grooming force can be avoided.

From the above disclosure, it may be seen that other embodiments of the principle of my invention are possible. For example, rather than bonding the strain gage to the substrate, the strain gage could be deposited on the substrate as a thin film using sputtering techniques as described in an article entitled "Sputtered Thin Films for Pressure Transducers" by R. Cheney and N. Samek in the magazine, *Research/Development*, pp. 53–61, April, 1977. The thin film strain gage produced in this manner could then be molded into the matrix of a one piece plastic comb and handle such that strain induced in the plastic when the comb is pulled through the hair would be transmitted to the strain gage. Such a solid plastic matrix would also protect the strain gages from mechanical damage and corrosion.

The invention has been shown and described with reference to a preferred embodiment. Other arrangements can readily be devised in accordance with the disclosed principle by those skilled in the art.

What is claimed is:

1. Apparatus for measuring hair grooming force comprising:
   hair grooming means for mechanically untangling hair fibers, said grooming means having a handle;
   electrical strain measuring means coupled to said grooming means for providing instantaneous and continuous electrical signals proportional to each incremental movement of said grooming means with respect to said handle; and
   a continuous monitor responsive to said electrical signals from said strain measuring means, said monitor being electrically connected to said strain measuring means for providing an instantaneous and continuous indication of each increment of said grooming force as measured by said electrical signals proportional to each incremental movement of said grooming means.

2. Apparatus for measuring hair grooming force according to claim 1, wherein said strain measuring means include at least one strain gage.

3. Apparatus for measuring hair grooming force according to claim 2, wherein said strain gage is connected to form an arm of a Wheatstone bridge type circuit.

4. Apparatus for measuring hair grooming force according to claim 1, wherein said strain measuring means include an amplifier circuit for providing an amplified signal to said continuous monitor.

5. Apparatus for measuring hair grooming force comprising:

hair grooming means for mechanically untangling hair fibers, said grooming means having a flexible shaft coupled to a handle to move in response to an applied force;

electrical strain measuring means coupled to said shaft for providing instantaneous and continuous electrical signals proportional to each incremental movement of said shaft with respect to said handle; and a continuous monitor responsive to said electrical signals from said strain measuring means, said monitor being electrically connected to said strain measuring means for providing an instantaneous and continuous indication of each increment of said grooming force as measured by said electrical signals proportional to each incremental movement of said shaft.

6. Apparatus for measuring hair grooming force according to claim 5, wherein said strain measuring means include at least one strain gage.

7. Apparatus for measuring hair grooming force according to claim 6, wherein said strain gage is connected to form an arm of a Wheatstone bridge type circuit.

8. Apparatus for measuring hair grooming force according to claim 5, wherein said strain measuring means include an amplifier circuit for providing an amplified signal to said continuous monitor.

9. A method for reducing the creation of split ends during hair grooming comprising the steps of:

grooming a hair tress with grooming means for mechanically untangling hair fibers;

measuring instantaneous and continuous electrical signals proportional to each incremental movement of said grooming means by electrical strain measuring means coupled to said grooming means;

providing an instantaneous and continuous indication of the magnitude of each increment of said grooming force as measured by said electrical signals proportional to each incremental movement of said grooming means; and reducing said grooming force applied to said hair tress by said grooming means to a previously indicated predetermined level when said predetermined level of incremental grooming force is exceeded.

* * * * *